J. E. BERMAN.
GRAIN SEPARATOR.
APPLICATION FILED AUG. 31, 1918.
1,294,030.
Patented Feb. 11, 1919.
2 SHEETS—SHEET 1.
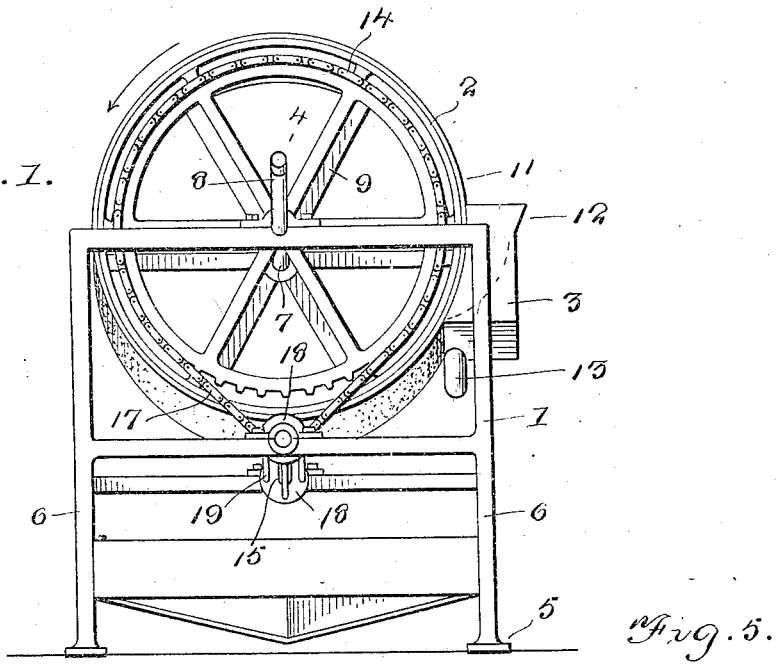
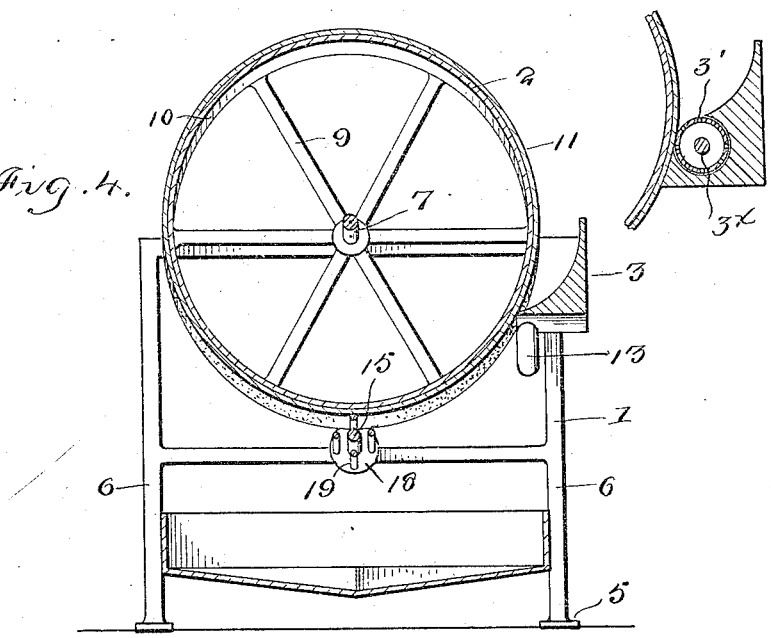
Witnesses
E. R. Ruppert
Inventor
J. E. Berman
By Victor J. Evans
Attorney

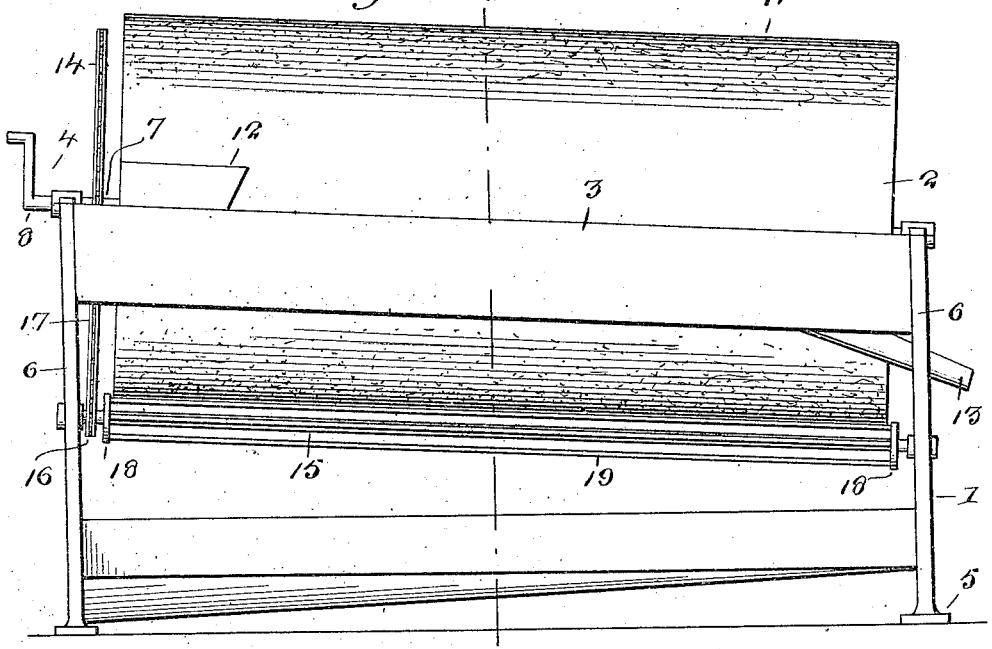
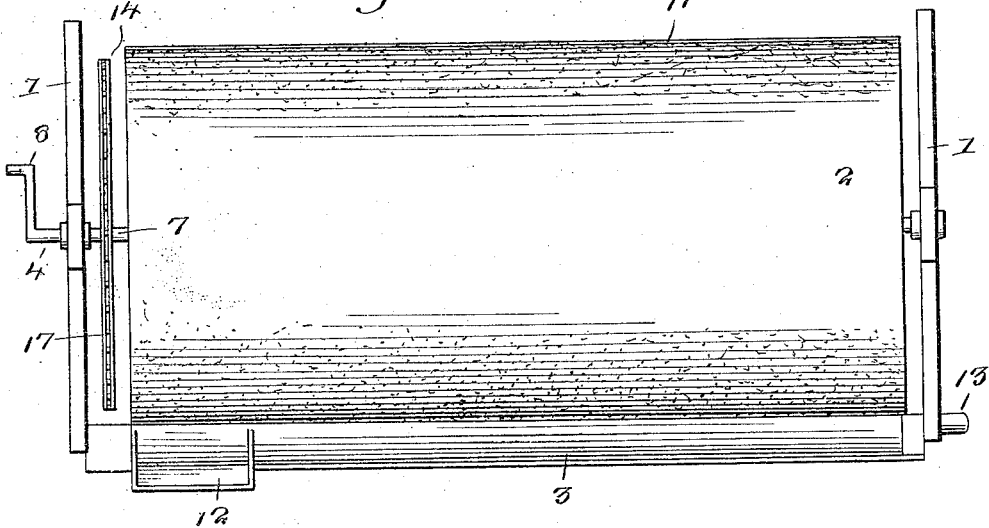

UNITED STATES PATENT OFFICE.

JOHN E. BERMAN, OF DILWORTH, MINNESOTA.

GRAIN-SEPARATOR.

1,294,030.  Specification of Letters Patent.  Patented Feb. 11, 1919.

Application filed August 31, 1918. Serial No. 252,194.

*To all whom it may concern:*

Be it known that I, JOHN E. BERMAN, a citizen of the United States, residing at Dilworth, in the county of Clay and State of Minnesota, have invented new and useful Improvements in Grain-Separators, of which the following is a specification.

This invention relates to new and useful improvements in grain separators and the principal object of the invention is to separate the grain from the seeds of weeds or the like.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an end view of the device.

Fig. 2 is a side view.

Fig. 3 is a top view.

Fig. 4 is a section on line 4—4 of Fig. 2.

Fig. 5 is a sectional view showing a modification.

As shown in these views the invention consists of a supporting frame 1, a drum 2, a trough or hopper 3 and operating means 4. The frame consists of a base 5 and the uprights 6. The drum comprises a shaft 7 having its ends journaled in the uprights and one end provided with a crank 8. 9 indicates the spiders carried by the shaft and supporting the cylinder 10 which form the periphery of the drum. The cylinder supports the cloth 11 which is made of flannel or similar material to which the weed seed, such as wild oats will stick.

The hopper or trough 3 extends along one side of the drum and is of curved shape with its lower end contacting with the cloth on the drum. In this way the drum forms one side of the trough. The drum is slightly inclined from one end to the other end and the upper end of the trough is provided with a receiving hopper 12 and its other end with an outlet chute 13.

The shaft 7 is provided with a sprocket wheel 14 and a second shaft 15 located below the drum is provided with a small sprocket wheel 16 and a chain 17 passes over said sprocket wheel so that the rotation of the shaft 7 will be transmitted to the shaft 15. This shaft 15 carries end pieces 18 and these end pieces support wires or small rods 19 which extend parallel with the shaft. The shaft 15 is so located that the wires 19 will contact with the cloth on the drum to free the same from the seeds carried thereby.

It will be seen that as the grain is fed to the hopper 12 and the drum rotated the said grain will slowly move toward the outlet end of the trough. This movement will bring them into contact with the cloth on the drum so that the wild oat seeds will be caught by the cloth and taken up in the rotation of the drum. These seeds will be removed from the cloth by the wires 19.

In the modification shown in Fig. 5 I show a separator for removing the small sized grains. This separator consists of a perforated drum 3' located in the trough 3 and having its periphery contacting with the large drum. In this way the smaller grains will drop through the perforations in the drum 3' and will drop out of the end of said drum which may be provided with an outlet chute. The drum is supported on a shaft $3^x$.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A separator of the class described comprising a cloth covered drum, a trough located to one side of the same, means for rotating the drum, a second drum contacting with the first drum and means on said second drum for removing the seeds from the first drum.

2. A separator of the class described comprising a cloth covered drum, a trough contacting with one side thereof, means for rotating the drum, a second drum made up of a plurality of wires which contact with the first drum and means for rotating the second drum from the first drum.

3. A separator of the class described comprising a cloth covered drum, a trough located at one side of the drum and having its lower edge contacting with said drum, a hopper at one end of said trough, an outlet chute at the other end thereof, a second drum located below the first drum and composed of a plurality of wires contacting with the first drum and means for rotating said drums.

4. A separator of the class described comprising a drum, a trough contacting with one side thereof, means for rotating the drum and a perforated drum within the trough and contacting with the first mentioned drum.

In testimony whereof I affix my signature.

JOHN E. BERMAN.